(12) United States Patent
Ursel et al.

(10) Patent No.: US 6,553,866 B1
(45) Date of Patent: Apr. 29, 2003

(54) CONTROL DEVICE FOR ADJUSTING EQUIPMENT ELEMENTS BELONGING TO A MOTOR VEHICLE

(75) Inventors: Eckhard Ursel, Buehl (DE); Erik Maennle, Oberkirch (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 09/786,850

(22) PCT Filed: Jun. 29, 2000

(86) PCT No.: PCT/DE00/02123

§ 371 (c)(1),
(2), (4) Date: Apr. 25, 2001

(87) PCT Pub. No.: WO01/03967

PCT Pub. Date: Jan. 18, 2001

(30) Foreign Application Priority Data

Jul. 9, 1999 (DE) .......................................... 199 32 047

(51) Int. Cl.[7] .................................................. B60N 2/02
(52) U.S. Cl. ...................... 74/665 G; 74/724; 297/330; 297/362.11
(58) Field of Search ............................ 297/362.11, 330; 248/419, 429; 74/724, 665 G, 665 GD, 665 F

(56) References Cited

U.S. PATENT DOCUMENTS

| 1,958,564 A | * | 5/1934 | Capps et al. ................... 74/724 |
| 4,932,290 A | | 6/1990 | Toyoda et al. |
| 5,092,197 A | | 3/1992 | Hauger |
| 5,103,691 A | | 4/1992 | Periou |
| 5,483,853 A | * | 1/1996 | Moradell et al. ....... 74/665 GD |

FOREIGN PATENT DOCUMENTS

| DE | 43 14 248 A1 | 9/1994 |
| WO | 97/42052 | 11/1997 |

* cited by examiner

*Primary Examiner*—Ankur Parekh
(74) *Attorney, Agent, or Firm*—Michael J. Striker

(57) ABSTRACT

A drive system for adjusting parts of motor vehicle equipment, in particular parts of a vehicle seat, having an electrical drive motor (10) which includes a drive motor shaft (12) and a worm (14) disposed on that shaft, also having a mechanical adjusting device, which includes at least one worm wheel (16) cooperating with the worm (14), one coupling unit, and one power takeoff unit. It is proposed that the coupling unit has at least two couplings (28), which are disposed on at least one auxiliary shaft (18) connected in a manner fixed against relative rotation to the at least one worm wheel (16), and which independently of one another couple the drive motor (10) to at least two power takeoff elements (54) of the power takeoff unit.

14 Claims, 2 Drawing Sheets

CONTROL DEVICE FOR ADJUSTING EQUIPMENT ELEMENTS BELONGING TO A MOTOR VEHICLE

PRIOR ART

Figure 1:
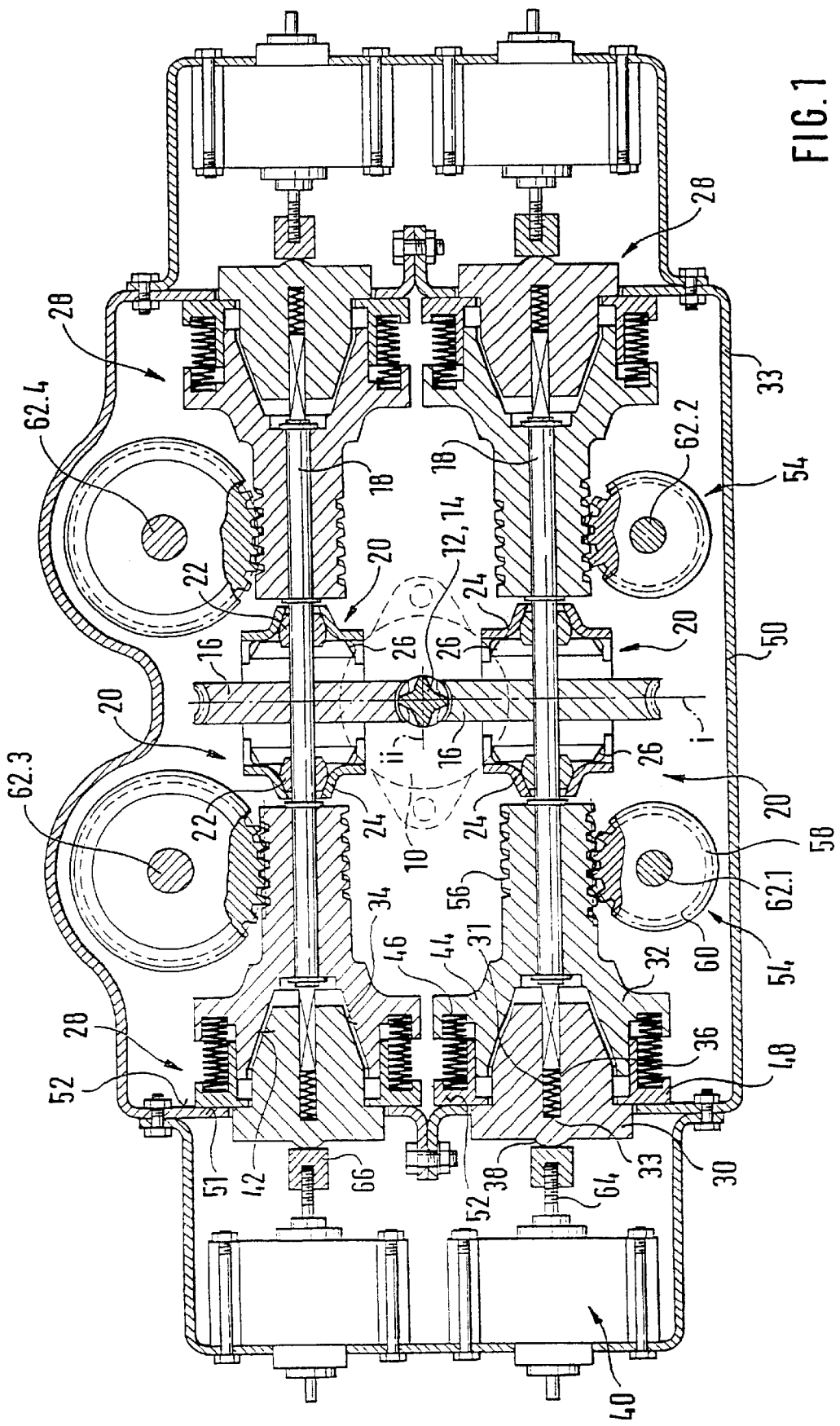

The invention relates to a drive system for adjusting parts of motor vehicle equipment, in particular parts of a vehicle seat, as generically defined by the preamble to the main claim.

Drive systems are already known which enable adjusting various equipment parts of a motor vehicle with only one motor, but these equipment parts cannot be moved independently of one another.

From German Patent Disclosure DE 43 14 248, for instance, a drive system is known with which selective adjustment of motor vehicle equipment parts is possible. This drive system includes an electric drive motor, which has coupling means that can be displaced in the direction of the motor armature pivot axis and that cooperate with respective counterpart coupling means operatively connected to equipment parts. The disadvantage of this drive system is that the parts to be moved cannot be moved independently of one another, because only one or the other coupling can ever be actuated selectively.

From International Patent Disclosure PCT/US 97/07718, a system for seat adjustment is known that because of the combination of electromechanical adjustment and pneumatic adjustment likewise requires only one universal motor. In this apparatus, the motor selectively communicates with a relatively loud pump of the pneumatic adjusting device for filling air bags, or with a mechanical adjusting device. If the adjustment takes a long time, it can happen that the air bags will empty just as the motor is acting on the mechanical adjusting device. Thus once again, complete independence of the various power takeoff elements is not guaranteed.

ADVANTAGES OF THE INVENTION

The drive system according to the invention for adjusting parts of motor vehicle equipment, having the characteristics of the main claim not only has the advantage that various power takeoff elements can be driven by a single electric drive motor, but also the decisive further advantage that the various power takeoff elements of the power takeoff unit are independent of one another.

In the drive system of the invention, the necessity of using one drive motor per power takeoff element is eliminated. Considerable weight and cost advantages can thus be attained. Furthermore, the drive system can be very compact in structure, which is a further advantage.

By the provisions recited in the dependent claims, advantageous refinements of the systems defined by the main claim are possible.

For instance, it is advantageous if the at least two couplings each have one coupling actuator for actuating the couplings. These coupling actuators are triggerable individually and independently of one another, and thus the force transmission from the electric drive motor to the various power takeoff elements can be done purposefully and independently of one another via the respective couplings.

For example, these coupling actuators can be axial lifting motors, which are equipped with an axially displaceable spindle and are operatively each connected to a first coupling element of the at least two couplings.

An especially compact embodiment of the drive system of the invention is attained if the at least two couplings are disposed on the respective two ends of the at least one auxiliary shaft. This adjacent disposition of the coupling actuators makes a symmetrical, space-saving, and extremely practical design of the drive system possible.

An especially advantageous embodiment of the couplings is attained if the couplings each comprise one first coupling element and one second coupling element. What is important is that the first coupling element, which can be put into operative connection to the coupling actuator, is connected to the auxiliary shaft in a manner fixed against relative rotation, while the second coupling element, which is connected to the power takeoff unit, is rotatably connected to the auxiliary shaft only in this way is targeted influence on the force transmission possible. The two coupling elements are embodied such that in the engaged state, a frictional engagement, and in the disengaged state if at all possible no connection, exists between the touching surfaces of the two elements.

If the coupling actuators disposed adjacent the first coupling elements are to be operatively connected to the respective first coupling element, then the force of the electric drive motor can be distributed in a targeted way to the various power takeoff elements independently of one another.

In an advantageous variant, the at least two power takeoff elements of the power takeoff unit include power takeoff worm wheels connected to power takeoff shafts, whose sets of teeth each mesh with one set of worm teeth, for instance, of the respective second coupling elements.

The use of worm gears furthermore makes a self-locking design possible, which prevents undesired adjustment of the equipment parts to be adjusted. Hence complicated provisions for fixing the parts to be moved are not required.

A major advantage is obtained if the power takeoff worm wheels have different diameters, or if power takeoff worm wheels with different diameters can be used. Then the possibility exists of varying the gear ratios and of adapting the torques, applied to the power takeoff worm wheels, optimally to the applicable demands made of the parts to be adjusted.

For example, the fact that when a vehicle seat is adjusted, for instance, the seat back adjustment requires less expenditure of force than adjusting the vehicle seat height or its longitudinal position, can be taken into account appropriately.

If the drive motor is disposed centrally, for instance precisely between the at least two couplings, then an especially compact structure of the drive system is possible, and the stresses occurring in operation are optimally distributed to the drive system.

By means of a control unit connected to the drive system, the advantageous possibility exists of controlled, targeted triggering of the individual power takeoff elements of the drive system.

DRAWING

In the drawing, one exemplary embodiment of a drive system of the invention is shown, and this is described in further detail in the ensuing description.

FIG. 1 shows the exemplary embodiment in section in a view from above, and

Figure 2:
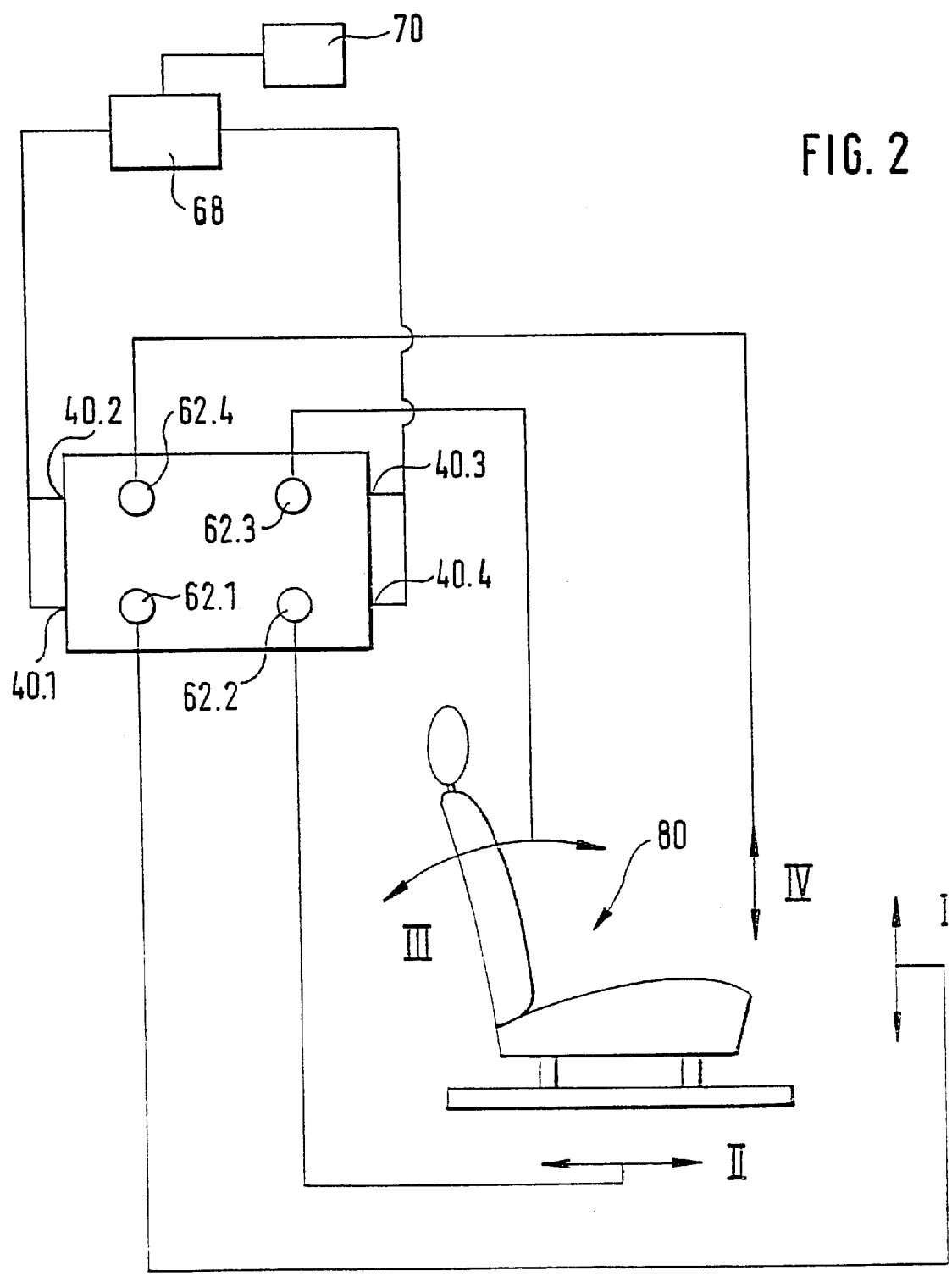

FIG. 2 schematically shows the binding of the exemplary embodiment of FIG. 1 on a vehicle seat.

DESCRIPTION OF THE EXEMPLARY EMBODIMENT

The drive system shown in FIG. 1 for adjusting parts of motor vehicle equipment has an electric drive motor 10 with a drive motor shaft 12 and a worm 14 disposed on the shaft. The worm 14, with its set of worm teeth, meshes with the sets of teeth of two worm wheels 16, which are disposed in a line i above and below the worm 14.

The center line ii through the drive motor 10 or drive motor shaft 12 is perpendicular to the center line i and forms a normal to the plane of the paper.

Two auxiliary shafts 18 are each connected to the two worm wheels 16 in a manner fixed against relative rotation and are each held at two bearing points 20 to the left and right of the worm wheels 16. The bearing of the auxiliary shafts 18 on the bearing points 20 is done with cup bearings 22, which surround the auxiliary shafts 18 and are each received by a respective bearing receptacle 24 solidly connected to the housing 50 of the drive system. They are each secured against falling out by a respective thin sheet-metal part 26 (speed nut).

On each of the two ends of the auxiliary shafts 18, embodied as hollow shafts, there are respective couplings 28, which have a first coupling element 30 and a second coupling element 32. A central recess 31 (blind bore) is machined into the first coupling element 30, and the end of a rod guided in the auxiliary shaft 18 protrudes into this recess. Thus the first coupling element 30 is connected to the rod of the auxiliary shaft 18 in a manner that is fixed against relative rotation but axially displaceable.

The first coupling element 30, on the end toward the second coupling element 32, has a friction cone 34. Also located in the recess 31 is a spring 36, which rests with one end on the end of the rod 19 and with its other end on the bottom 33 of the recess 31. It presses a protuberance 38 of the first coupling element 30 against a coupling actuator 40, to be described hereinafter, and assures that the first coupling element is always operatively connected to the coupling actuator 40.

The second coupling element is supported all the way around, rotatably on the auxiliary shaft 18 and has an internal cone 42, whose form is complementary to that of the friction cone 34 of the first coupling element 30.

The second coupling element 32, on its outer circumference, is connected via a plurality of compression springs 46 to a pressure ring 48 surrounding the first and second coupling elements 30 and 32. The face 51 of the pressure ring 48 toward the housing 50 is in frictional contact, in the disengaged state of the coupling 28, with an inner face 52 of the housing 50. This frictionally engaged contact reinforces the self-locking of the power takeoff worm gear arrangement, comprising the second coupling element 32 and the power takeoff elements 54 to be described hereinafter. In the engaged state of the couplings 28, the compression springs 26 are compressed and thereby release the frictionally engaged contacts. Thus what during operation is an undesired hindrance to force transmission from the drive motor 10 to the individual power takeoff elements 54 via the couplings 28 is prevented.

The second coupling element 32 has a set of worm teeth 56 that extend largely over its bearing region on the auxiliary shaft 18. This set of worm teeth 56 is operatively connected to a set of teeth 58 of the power takeoff element 54. The four power takeoff elements 54 of the exemplary embodiment each include one power takeoff worm wheel 60 and one power takeoff shaft 62 connected to it, to which shaft the equipment parts to be adjusted are bound.

The actuation of the couplings 28 or first coupling elements 30 is done via one coupling actuator 40 each. In the exemplary embodiment shown, these coupling actuators 40 are embodied as axial lifting motors, which have an axially displaceable spindle 64. On the ends of the threaded spindles 64 remote from the coupling actuators 40, coupling elements 66 of elastic but not overly soft material are provided, which act on the protuberances 38 and assure gentle engagement and disengagement of the couplings 28.

In FIG. 2, the binding of the exemplary embodiment of FIG. 1 to a vehicle seat is shown schematically.

The four outputs 40.1 through 40.4 of the coupling actuators 40 are connected to a supervisory control unit 68, which enables controlled, targeted triggering of the individual coupling actuators 40 independently of one another, via a control part 70 connected to the coupling actuators.

The four power takeoff shafts 62.1 through 62.4, in the exemplary embodiment shown, are connected to four different adjusting mechanisms I–IV of a vehicle seat 80. Concretely, the two power takeoff shafts 62.1 and 62.2 with the lesser step-up are connected to the adjusting mechanisms I and II for adjusting the seat height and adjusting the seat longitudinally, and the two power takeoff shafts 62.3 and 62.4 with the greater step-up are connected to the adjusting mechanisms III and IV for adjusting the seat back and adjusting the height of the seat surface at the front.

The drive system of the invention is not limited to the exemplary embodiment shown in FIGS. 1 and 2; still other versions are conceivable, such as a drive system with up to eight power takeoff elements, in which a correspondingly strong motor drives two of the modules shown in FIG. 1, disposed one after the other.

The use of other gear technologies and coupling mechanisms is also conceivable in principle; what is decisive is solely the independence of the various power takeoff elements from one another.

What is claimed is:

1. A drive system for adjusting parts of a motor vehicle, having an electrical drive motor (10) which includes a drive motor shaft (12) and a worm (14) disposed on that shaft, also having a mechanical adjusting device, which includes at least one worm wheel (16) cooperating with the worm (14), one coupling unit, and one power takeoff unit, characterized in that the coupling unit has at least two couplings (28), which are disposed on at least one auxiliary shaft (18) connected in a manner fixed against relative rotation to the at least one worm wheel (16), and which independently of one another couple the drive motor (10) to at least two power takeoff elements (54) of the power takeoff unit which are arranged radially to the at least one auxiliary shaft (18).

2. The drive system of claim 1, characterized in that the at least two couplings (28) each have one first coupling element (30) and one second coupling element (32).

3. The drive system of claim 2, characterized in that each of the first coupling elements (30) is connected in a manner fixed against relative rotation to the at least one auxiliary shaft (18).

4. The drive system of claim 2, characterized in that each of the second coupling elements (32) is connected rotatably to the at least one auxiliary shaft (18).

5. The drive system of claims 2, characterized in that the at least two couplings (28) have coupling actuators (40)

which are bringable into operative connection with the first coupling element (30) each.

6. The drive system of claim 1, characterized in that the drive motor (10) is disposed centrally.

7. The drive system of claim 1, characterized in that a supervisory control unit (68) is connected to the coupling actuators (40).

8. A drive system for adjusting parts of a motor vehicle, having an electrical drive motor (10) which includes a drive motor shaft (12) and a worm (14) disposed on that shaft, also having a mechanical adjusting device, which includes at least one worm wheel (16) cooperating with the worm (14), one coupling unit, and one power takeoff unit, characterized in that the coupling unit has at least two couplings (28), which are disposed on at least one auxiliary shaft (18) connected in a manner fixed against relative rotation to the at least one worm wheel (16), and which independently of one another couple the drive motor (10) to at least two power takeoff elements (54) of the power takeoff unit, the at least two couplings (28) each having one coupling actuator (40) for actuating the couplings (28).

9. A drive system for adjusting parts of a motor vehicle, having an electrical drive motor (10) which includes a drive motor shaft (12) and a worm (14) disposed on that shaft, also having a mechanical adjusting device, which includes at least one worm wheel (16) cooperating with the worm (14), one coupling unit, and one power takeoff unit, characterized in that the coupling unit has at least two couplings (28), which are disposed on at least one auxiliary shaft (18) connected in a manner fixed against relative rotation to the at least one worm wheel (16), and which independently of one another couple the drive motor (10) to at least two power takeoff elements (54) of the power takeoff unit, wherein the at least two couplings (28) are disposed on the respective two ends of the at least one auxiliary shaft (18).

10. A drive system for adjusting parts of a motor vehicle, having an electrical drive motor (10) which includes a drive motor shaft (12) and a worm (14) disposed on that shaft, also having a mechanical adjusting device, which includes at least one worm wheel (16) cooperating with the worm (14), one coupling unit, and one power takeoff unit, characterized in that the coupling unit has at least two couplings (28), which are disposed on at least one auxiliary shaft (18) connected in a manner fixed against relative rotation to the at least one worm wheel (16), and which independently of one another couple the drive motor (10) to at least two power takeoff elements (54) of the power takeoff unit, the at least two couplings (28) each have one first coupling element (30) and one second coupling element (32), and the at least two couplings (28) have coupling actuators (40) disposed adjacent to the first coupling elements (30) on the two ends of the at least one auxiliary shaft (18).

11. A drive system for adjusting parts of a motor vehicle, having an electrical drive motor (10) which includes a drive motor shaft (12) and a worm (14) disposed on that shaft, also having a mechanical adjusting device, which includes at least one worm wheel (16) cooperating with the worm (14), one coupling unit, and one power takeoff unit, characterized in that the coupling unit has at least two couplings (28), which are disposed on at least one auxiliary shaft (18) connected in a manner fixed against relative rotation to the at least one worm wheel (16), and which independently of one another couple the drive motor (10) to at least two power takeoff elements (54) of the power takeoff unit, and the at least two power takeoff elements (54) of the power takeoff unit are power takeoff shafts (62) connected to power takeoff worm wheels (60).

12. The drive system of claim 11, characterized in that the at least two couplings (28) each have one first coupling element (30) and one second coupling element (32) and the second coupling elements (32) each have a set of worm teeth, which are operatively connected to the power takeoff worm wheels (60).

13. The drive system of claim 11, characterized in that the power takeoff worm wheels (60) have different diameters.

14. A drive system for adjusting parts of a motor vehicle equipment, in particular parts of a vehicle seat, having an electrical drive motor (10) which includes a drive motor shaft (12) and a worm (14) disposed on that shaft, also having a mechanical adjusting device, which includes at least one worm wheel (16) cooperating with the worm (14), one coupling unit, and one power takeoff unit, characterized in that the coupling unit has at least two couplings (28), which are disposed on at least one auxiliary shaft (18) connected in a manner fixed against relative rotation to the at least one worm wheel (16), and which independently of one another couple the drive motor (10) to at least two power takeoff elements (54) of the power takeoff unit, the at least two couplings (28) each have one coupling actuator (40) for actuating the couplings (28) and a supervisory control unit (68) is connected to the coupling actuators (40).

* * * * *